March 14, 1950  W. R. McKAY  2,500,847
SEPARABLE COUPLER FOR HOSE OR PIPE
Filed July 13, 1948
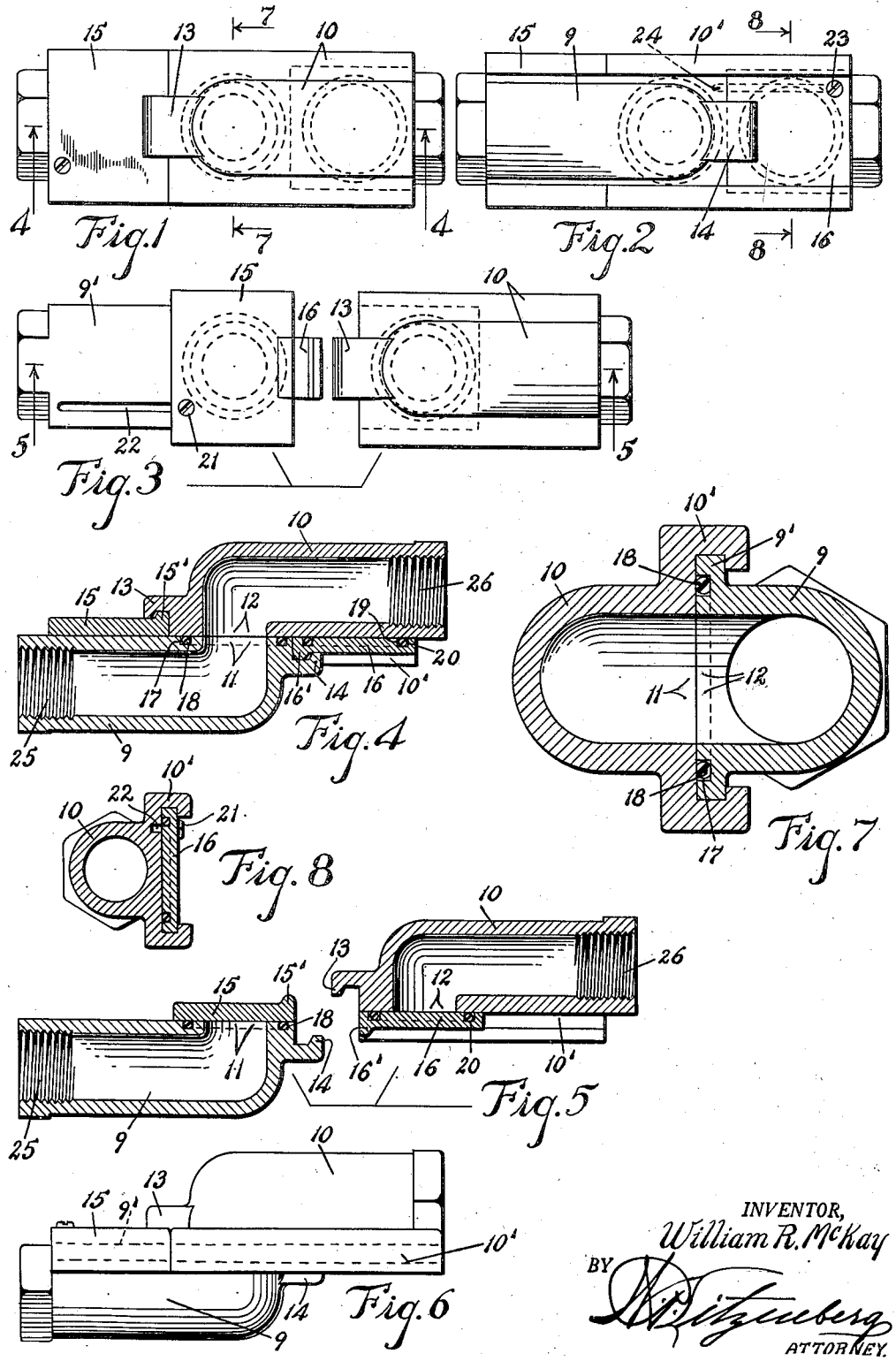
INVENTOR,
William R. McKay
BY
ATTORNEY.

Patented Mar. 14, 1950

2,500,847

UNITED STATES PATENT OFFICE 2,500,847

SEPARABLE COUPLER FOR HOSE OR PIPE

William R. McKay, Compton, Calif.

Application July 13, 1948, Serial No. 38,526

6 Claims. (Cl. 284—7)

This invention relates to separable couplers for hose, or pipe, and has as its principal object to provide a pair of coupling members, each having means associated therewith for closing it as it is separated from the other, whereby to prevent leakage and waste of fluid flowing therethrough.

Another object of the invention is to provide a pair of coupling members, each having a sliding closure member associated therewith for automatically closing its opening, or mouth, as one coupling member is separated from the other.

Another object of the invention is to provide in connection with two coupling members, having face to face sliding engagement with each other, two closure members having annular channels in their faces with rings of suitable sealing material therein, to seal the joints between said coupling members when they are together mouth to mouth, or when said closure members are moved over the mouths of said coupling members.

The invention is particularly adaptable for quickly connecting a remote cylinder or hydraulic ram to the power source, or hydraulic pump, or in many other places where hydraulic power is to be coupled to some machinery or mechanism to be hydraulically operated, and to couple and uncouple such power fluid without possible loss of the fluid.

Other objects and advantages of the invention will be brought to mind in connection with the following more detailed description of one practical embodiment thereof, taken with the accompanying sheet of drawings, in which Figure 1 is a plan view of a pair of coupling members together;

Figure 2 is a bottom plan view thereof;

Figure 3 is a plan view of said members separated;

Figure 4 is a vertical, longitudinal sectional view thereof, taken on the line 4—4 of Fig. 1;

Figure 5 is a similar view with the coupling members separated and showing the closure members over the mouths of said coupling members;

Figure 6 is an edge or side elevation of the coupling members;

Figure 7 is an enlarged transverse sectional view taken on the line 7—7 of Fig. 1; and Figure 8 is a sectional view taken on line 8—8 of Fig. 2.

Referring now in detail to the drawings, the invention as here illustrated for explanatory purposes includes two coupling members 9 and 10, each having one flat side with projecting flange portions as at 9', one of said members having its flange portions formed to slidably receive the flange portion of the other member, as 10', Fig. 7. When said coupling members are together, as in Fig. 1, their openings or mouths, designated 11 and 12, are together, as seen in Fig. 4.

Each of said coupling members has formed on its overlapping end, hook portions, as 13 and 14, designed to hook over the ends of two closure members 15 and 16, and for this purpose said closure members are provided with ridge parts, as 15' and 16' to receive said hook portions, as seen in Figs. 4 and 5.

Around the opening or mouth 11, of member 9, is an annular channel 17, in which is placed a sealing ring 18. This seals the joint between the two coupling members 9 and 10, as their faces come together flatwise, as seen in the sectional views, Figs. 4 and 7.

The face of the closure member 16 is also provided with an annular channel 19, in which is placed a sealing ring 20. These sealing rings can be arranged in either the coupling members or the closure members, as may be desired, just so there is a sealing ring around the mouth or opening to prevent leakage at the joint of two members flatwise together, whether coupling members, or a coupling member and a closure member.

Referring to Figs. 4 and 5, corresponding to Figs. 1 and 3, as coupling member 10 is pulled to the right, it pulls closure member 15 over the mouth 11 of coupling member 9, and this joint is sealed by said sealing ring 18, as seen in Fig. 5. The mouth 12 of coupling member 10, at the same time, is moved over closure member 16, and is sealed by sealing ring 20, as seen in said Fig. 5. Closure member 15 has its opposite sides formed into slideways to move on the flange edges 9' of the member 9, as seen in Fig. 6, and closure member 16 moves in the slideways 10' formed along the opposite sides of coupling member 10. Thus when member 10, as seen in Fig. 4, is pulled to the right, to the position shown in Fig. 5, its hook 13, over the ridge 15' on closure member 15, pulls said closure member 15 over the mouth 11 of member 9, while the mouth 12 of member 10 moves over closure member 16, held by the hook 14 on member 9, until said coupling members 9 and 10 can separate, as seen in Fig. 5.

As one means of stopping the closure member 15, as it is pulled to the right, from the position seen in Fig. 1, and the position shown in Figs. 3 and 5, said closure member is provided with a stop screw 21 therethrough and the end of which moves in a slot or channel 22 in the face of the coupling member 9. This same kind of stop is provided for closure member 16, moving in the slideways on coupling member 10. This stop screw 23 and its stop channel 24 can be seen in the bottom plan view of Fig. 2.

Each of said coupling members 9 and 10, at its outer end, is internally threaded, as at 25 and 26, respectively, for attachment of hose or pipe thereto, as may be required for the use to which the coupling is to be put.

I am aware that changes in the details of construction and arrangement as here shown for illustrative purposes can be made without departing from the spirit of the invention, and I do not, therefore, limit the invention to these details, except as I may be limited by the hereto appended claims forming a part of this specification.

I claim:

1. A separable coupling member for hose and the like, including two coupling members with means for attaching them to the ends of two lengths of hose to be coupled, said coupling members each having slidably associated with it a closure member movable over said mouth to close it, each coupling member being connected with the closure member for the other coupling member, whereby to automatically move said closure members over their respective mouths to close them as said coupling members are separated.

2. A separable coupling for hose including two coupling members having flat sides to be brought together face to face with their mouths in register to form a flow passageway therethrough, a closure member associated with one of said members and movable over its mouth to close said mouth to prevent leakage therefrom, the other coupling member being detachably connected with said closure member for automatically moving it over said mouth as said coupling members are separated.

3. A hose coupling including two members to be attached to two lengths of hose to be coupled, each having a flat side with its mouth opening therethrough, whereby when said coupling members are brought together face to face said mouths are in register and form a flow passageway, two closure members for said coupling members slidably connected therewith to be moved over their mouths, respectively, to close said mouths as said coupling members are separated, each coupling member being connected with the closure member for the other coupling member and operable to automatically move said closure members over said mouths as said coupling members are separated.

4. A separable coupling including two coupling members having means for connecting them to two lengths of hose and having their free ends designed to slidably overlap each other with mouths in register to form a flow passageway from one to the other, sealing means around one of said mouths to prevent leakage at the meeting faces of said coupling members, and a closure member slidably associated with one of said coupling members to close its mouth as said coupling members are separated, one coupling member being connected with the closure member for the other coupling member for automatically moving said closure member over said mouth as said coupling members are separated.

5. A separable hose coupling including two coupling members having flat faces to slidably overlap each other when said coupling members are moved lengthwise together one upon the other, their mouths being in register with each other to form a flow passageway from one to the other, closure members movable over said mouths with connecting means from each coupling member to the closure member for the other coupling member for automatically moving them to closing positions as said coupling members are separated, to prevent leakage, and sealing means between the meeting faces of said coupling members when they are together and between said faces and said closure members when said closure members are moved over said mouths to close them.

6. A separable hose coupling including two coupling members having flat faces to overlap each other when coupled together with their mouths in register with each other to form a flow passageway from one to the other, closure members upon said faces adjacent the mouths of said coupling members and means for slidably holding them in place, hook means on one coupling member to hook onto one closure member to pull said closure member over the mouth of the other coupling member as said coupling members are separated, whereby to close said mouth and prevent leakage and waste of fluid therein.

WILLIAM R. McKAY.

REFERENCES CITED

The following references are of record in the file of this patent:

UNITED STATES PATENTS

| Number | Name | Date |
| --- | --- | --- |
| 529,290 | McCarty | Nov. 13, 1894 |
| 587,111 | Walters | July 27, 1897 |
| 605,323 | Muhr | June 7, 1898 |
| 1,077,417 | McCracken | Nov. 4, 1913 |